J. REDHEAD.
Seed Planter.

No. 19,579.

Patented Mar. 9, 1858.

UNITED STATES PATENT OFFICE.

JOSEPH REDHEAD, OF WOODVILLE, MISSISSIPPI.

IMPROVEMENT IN SEED-PLANTERS.

Specification forming part of Letters Patent No. 19,579, dated March 9, 1858.

*To all whom it may concern:*

Be it known that I, JOSEPH REDHEAD, of Woodville, in the county of Wilkinson and State of Mississippi, have invented certain new and useful Improvements in Machines for Planting Cotton and other Seeds; and I do hereby declare the following to be a full, clear, and exact description of the construction and operation of the same, reference being had to the accompanying drawings, making a part of this specification, in which—

Figure 1:
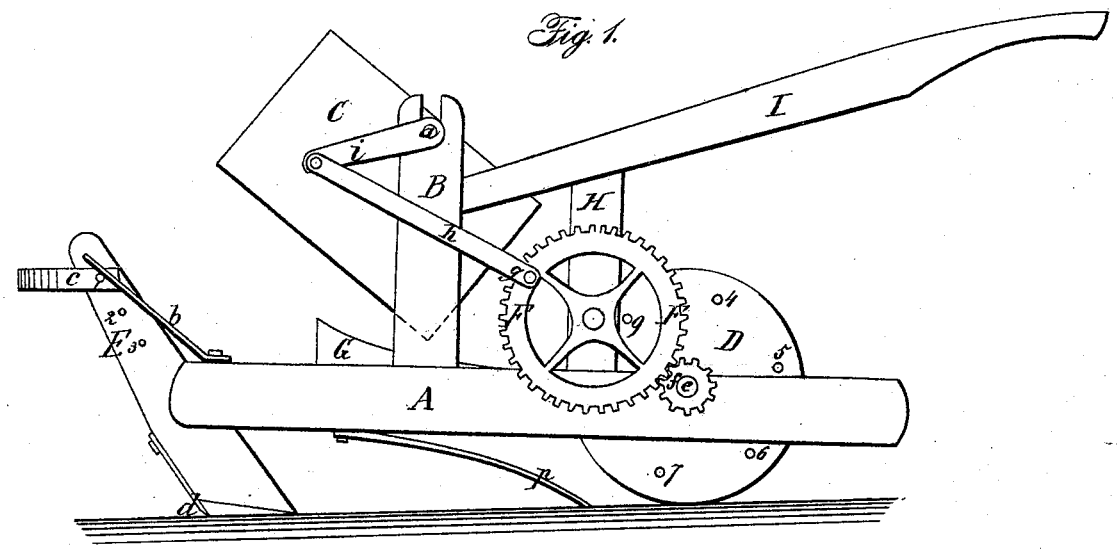
Figure 2:
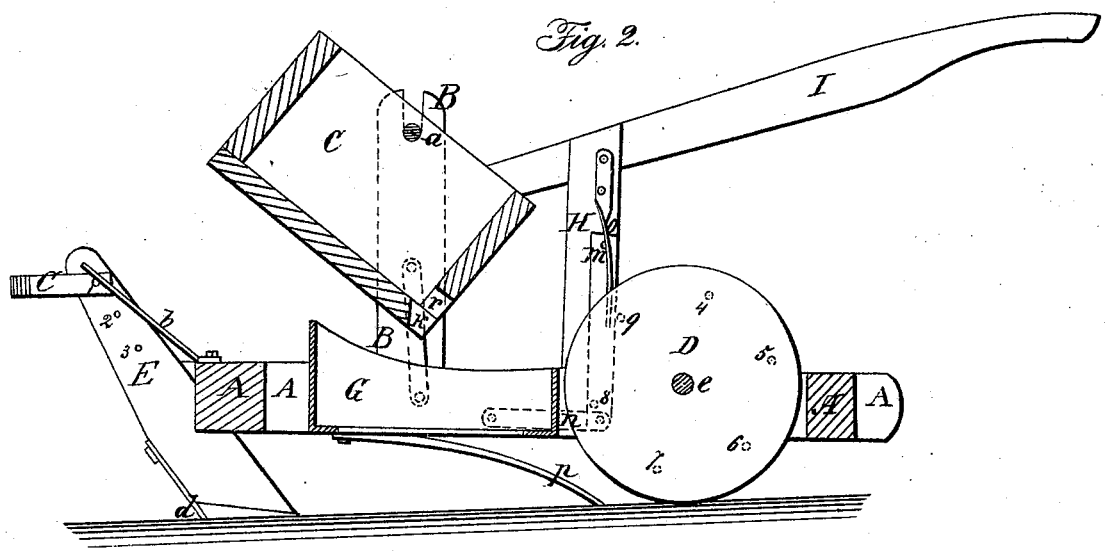

Figure 1 represents a side elevation of the planter. Fig. 2 represents a vertical longitudinal section through the same.

Similar letters of reference, where they occur in the separate figures, denote like parts of the apparatus in both of them.

The nature of my invention relates, first, to the construction and operation of the seed-distributer, and, secondly, to the oscillating supply-box which furnishes the distributer with seed.

To enable others to make and use my invention, I will proceed to describe the same with reference to the drawings.

A represents a rectangular or other suitably-shaped frame, upon which there are standards B, that support the journals of a shaft, $a$, which carries a supply-box, C, to receive the seeds that are to be planted. Near the rear portion of this frame there is a wheel, D, that performs triple service, viz: It supports the machine, agitates the distributer, and operates the supply-box, and, lastly, presses the soil down upon the planted seed.

To the front of the frame there is connected a head-post, E, braced by rods $b$ to the frame, and furnished with a series of holes, 1 2 3, for adjusting and holding the clevis $c$, to which the horse or horses are attached. To the bottom or lower end of this head-block is affixed a shoe or furrow-opener, $d$, for making a drill, into which the seed are dropped.

On the shaft or axis $e$ of the wheel D there is a pinion, $f$, which takes into and turns a gear-wheel, F; and to a wrist-pin, $g$, on this gear-wheel one end of a connecting-rod, $h$, is attached, the other end of said rod being attached to the wrist-pin of the crank $i$, fastened onto the heretofore-described shaft $a$, that carries the supply-box C, and by this arrangement said supply-box receives a rocking or oscillating motion on its shaft $a$.

The seed-distributer G is hung to the standards B by vertical suspension-straps $k$, and to the other uprights, H, by pivoted straps $m$ $n$, so that it can have a double motion for agitating the seeds therein, and causing them to be sifted through the opening or openings in the bottom of said distributer. On the faces of the wheel D there are pins 4 5 6 7 8 9, which, as said wheel revolves, strike against projections on the suspension-rods $m$ and throw them forward against the action of springs $o$, which press against them. When the pins pass these projections, the springs $o$ bring back the distributer with a sudden jar, and thus said distributer is agitated. There may be one long slot or opening in the bottom of the agitator, or two or more, just as the user may prefer. Underneath the frame there is a coverer, $p$, that drags the soil over the deposited seeds, and then the wheel D presses it down on them.

There is an opening, $r$, in the supply-box, which may be made of any size, and covered with a slide to regulate the opening to the quantity of seed that is to pass through it. As the supply-box C is constantly swinging on its shaft it distributes its contents into the box G, and the agitation of this box sifts it through its bottom, and it drops into the furrow or bed prepared for it. By these means of supplying seeds—such as cotton-seed—from the first receptacle to the ground, there is not that liability, due to such seed, to choke or clog in its passage, and thus prevent regular planting. The opening in the supply-box may be at one or both of its ends, or through the bottom longitudinally or transversely, as may be preferred.

The handles I are connected to the uprights H B. The agitation of the distributer may be lateral instead of longitudinal, or in any other direction that will effect the object of sifting the seeds into the hopper.

Having thus fully described the nature and operation of my invention, what I claim therein as new, and desire to secure by Letters Patent, is—

1. The seed-distributer G, hung upon hinged arms, and agitated, as herein described, for the purpose of sifting the seeds through the opening or openings in its bottom, as set forth.

2. A supply seed-box, rocking or oscillating on its supports, as an auxiliary in furnishing the distributer with seeds, without so overcharging said distributer as to cause the seed to choke or clog therein, substantially as described.

JOSEPH REDHEAD.

Witnesses:
WILLIAM WRIGHT,
A. WILKINSON.